F. K. FASSETT.
MEASURING MACHINE.
APPLICATION FILED APR. 5, 1911.

1,168,615.

Patented Jan. 18, 1916.
8 SHEETS—SHEET 6.

WITNESSES:
C. H. Kruger
Nettie Sides

INVENTOR.
Francis K. Fassett.

Fig. 32

UNITED STATES PATENT OFFICE.

FRANCIS K. FASSETT, OF DAYTON, OHIO, ASSIGNOR TO THE NATIONAL GRANOMETER COMPANY, LIMITED, OF PATTERSON, LOUISIANA.

MEASURING-MACHINE.

1,168,615.  Specification of Letters Patent.  Patented Jan. 18, 1916.

Application filed April 5, 1911. Serial No. 619,085.

*To all whom it may concern:*

Be it known that I, FRANCIS K. FASSETT, a citizen of the United States, residing at Dayton, in the county of Montgomery and State of Ohio, have invented a new and useful Improvement in Measuring-Machines, of which the following is a specification.

My invention relates to machines for measuring various commodities or substances; in the present application, the embodiment best adapted to measuring granular commodities, such as rice, coffee, beans, etc., will be shown and described. That the principles employed will be applicable to machines for measuring other substances, will presently be manifest.

Briefly, my machine comprises a measuring compartment, having a variable capacity; a commodity storage receptacle; a chute connecting the receptacle with the measuring compartment and a spout for discharging it from the compartment, and suitable means for controlling the movement of the commodity contained in the storage receptacle. The operation of the machine is effected by a plurality of push buttons, marked by symbols of import, and a foot pedal. The symbols may represent any type of import, such, for example, as monetary values, weights, or volumes. Suppose they represent volume, and that a given volume is to be taken from the commodity receptacle; the button representing the required amount is pressed and the pedal pushed down. The latter act causes an adjustment of the capacity of the measuring compartment to the proper amplitude and opens a valve separating the compartment from the commodity receptacle, permitting the compartment to fill with commodity. The pedal is then allowed to return to its normal position, thereby closing the valve and opening another to permit the discharge of the measured commodity through the spout. The mechanism controlled by each button may be set so that the machine will deliver any desired amount of commodity within the capacity of the measuring compartment. Provision is made whereby the amount of commodity necessary to represent a given import may be quickly and accurately determined. Suitable graduations are provided whereby to set the button-actuated mechanism.

The advantages derived from my machine will be pointed out and explained at appropriate intervals.

In the accompanying drawings, Fig. 18A shows the manner of removing the stud from or attaching it to the plate 106.

Like numerals refer to similar parts throughout.

Referring now to the drawings, 50 and 51 are legs, to which a base plate 52 is secured by suitable bolts. The lower ends of the legs are tied together by rods 84—84, one of which is placed higher than the other, both of them being used for other purposes, as will appear later. Side frames 53 and 54 are secured to the base by suitable screws; between the frames, and carried by them, is the measuring compartment 55, which will hereinafter be called the varimeter. In form the varimeter is a sector of a cylinder, in which one of the radial walls, 56, is mounted on pivots 57, journaled in holes formed in the sides of the varimeter and coinciding with holes in the frames 53 and 54. The pivots 57 are made of short pieces of round rod having slots adapted to fit over ears projecting from the wall 56, each projection having a recess in its lower edge, into which portions of the pivots are swaged, thereby securing them to the ears; see Figs. 22 and 23. The other radial wall, 58, hereinafter called the gate, is arranged to slide in grooves in the frames 53 and 54.

Plates 59 and 60 form opposite sides of the chute through which commodity is conducted from the storage receptacle to the varimeter and afterward from the varimeter to the spout. The lower ends of these plates are bolted to lugs 61 and 62 on the base. An ear 63 is riveted on each plate and secured by screws 64 to lugs on the frames 53 and 54. The plates 59 and 60 are parallel with each other for about half their lengths, and above that they diverge, terminating in short parallel portions lying against the sides of the cabinet. The diverging portions are connected by plates 65 and 66, the lower end of the former terminating on a line approximately even with the pivots 57; its upper end lies against the back plate of the cabinet. The plate 66 has an extension 67, approximately perpendicular thereto, resting on and bolted to flanges formed on the side plates of the cabinet; flanges 68, integral with extension 67, lie against the said side plates. The parallel portions of the plates 59 and 60 are connected by a partition 69, which, with a short section 70, connecting 66 and 69, completes the chute for conducting commodity from the storage receptacle to the varimeter.

It will be observed that the general direction of the chute is inclined; this, while not essential, is desirable for two reasons: First, it affords a short and direct connection with the spout, which for obvious reasons should be in a prominent position; second, the capacity of the varimeter is thereby increased. There is a practical limit to the fluidity of granular commodities, and to insure the complete filling of all portions of the varimeter, the radial walls should never be very near horizontal. Therefore, to keep the wall 56 from requiring too great an elevation when the varimeter is expanded to its maximum capacity, and at the same time secure the greatest possible capacity consistent with a given axial length, the sweep of the wall 56 each side of a vertical line should be approximately the same.

Figure 1:
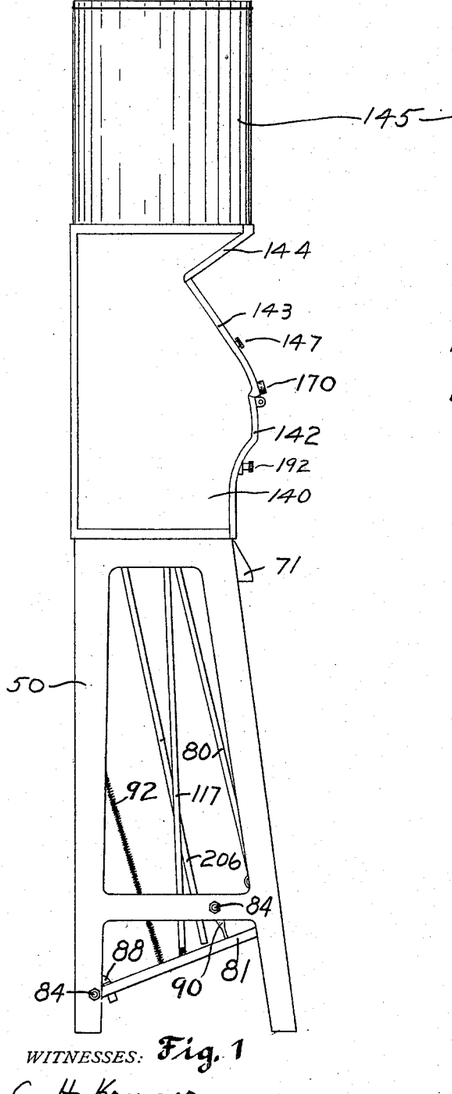
Figure 1 is a side elevation of the machine.

The chute connecting the varimeter with the spout 71, comprises the lower ends of the plates 59 and 60, a front plate 72, a short section 73, and the extension 74 forming part of the base 52. The section 73 is a plate adapted to close the gap between the front edge of the varimeter and the base 52. It is supported by a rod 75 interposed endwise between and carried by the frames 53 and 54. The front plate 72 is preferably bent, its upper end terminating at a short intermediate member 76 which connects it with the partition 69. For convenience in manufacturing, the following members may be formed integral—70, 69, 76 and 72. The member 76 is parallel with and practically in contact with the gate 58. When the gate is in its normal position, see Figs. 6 and 8, its lower edge approximately coincides with the lower edge of the member 76. The gate has ears 77 carrying studs 78; blocks 79 are rotatably mounted on the studs. Each block has a tapped hole close to the hole through which the stud 78 passes, in which a pull rod 80 is screwed, the lower ends of the rods being connected to the pedal 81. Fig. 1 shows the pedal in normal position, and Fig. 3 shows it pushed down; when it is in this position, that of the gate 58 is as seen in Fig. 9.

Figures 3, 3A, 4, 4A:
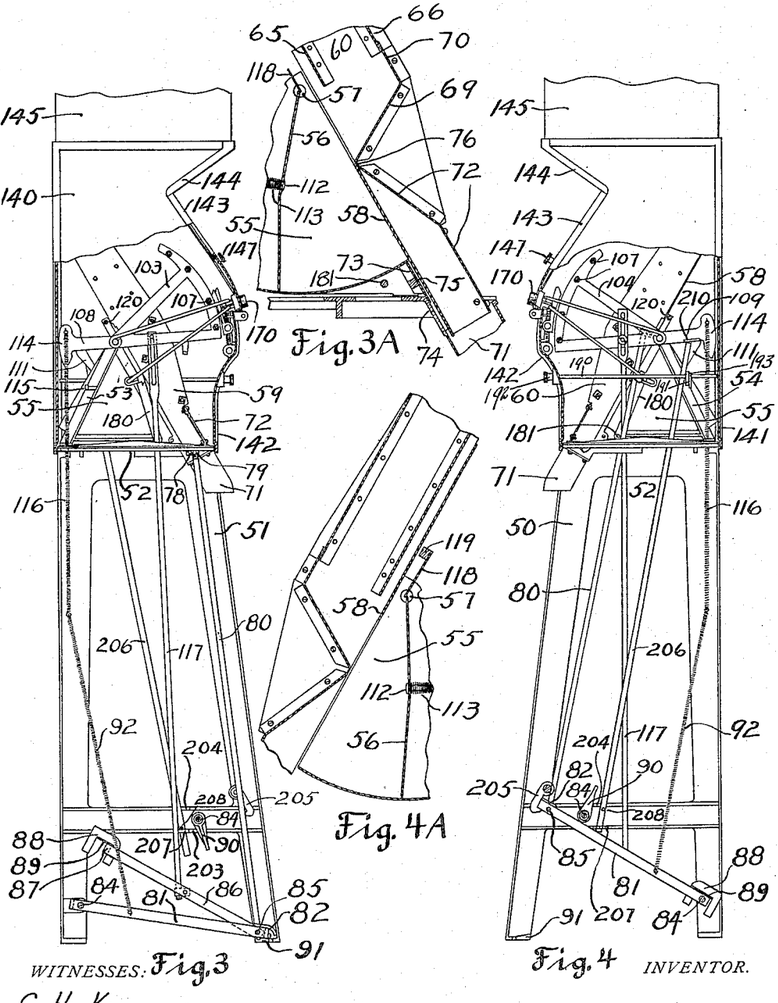
Fig. 3 is a side elevation with a portion of the cabinet and the near leg removed.
Fig. 3A is a fragmentary view of portions of the machine when its parts are in the position shown in Fig. 3.
Fig. 4 is a side elevation, opposite to that shown in Fig. 3, with a portion of the cabinet and the near leg removed.
Fig. 4A is a fragmentary view of a portion of the interior, when the parts are in positions shown in Fig. 4.
Figure 6:
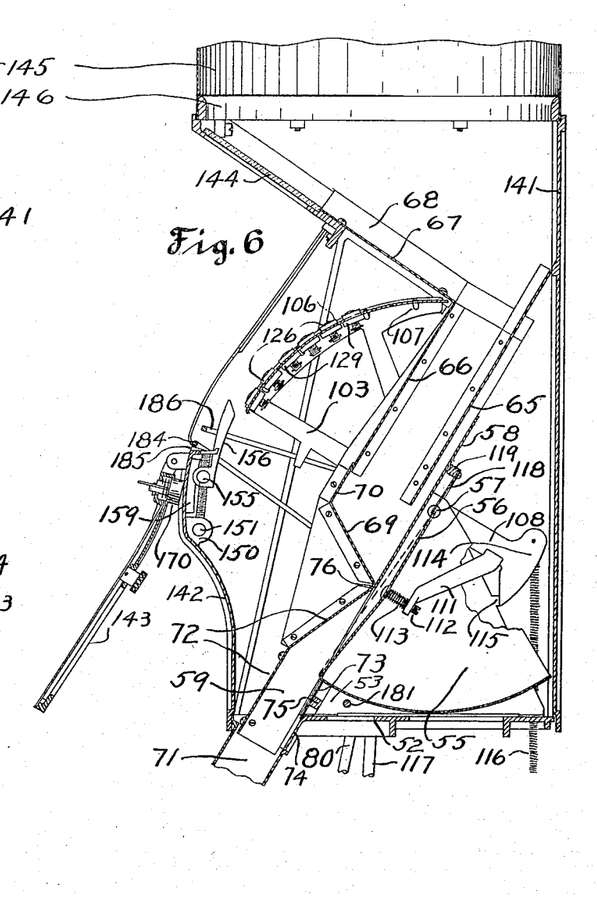
Fig. 6 is a vertical section through the center of the machine.
Figures 7, 8, 9, 10:
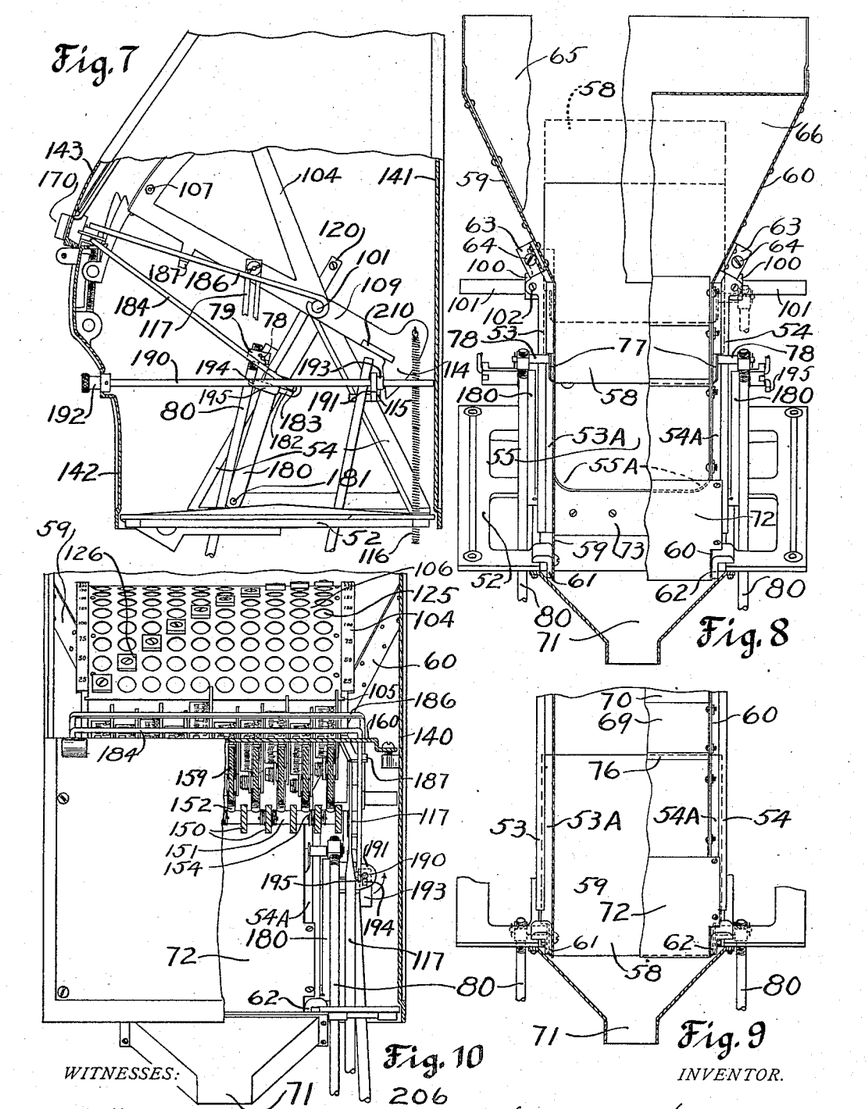
Fig. 7 is a side elevation, showing the parts adjusted for repeated operation.
Fig. 8 is a front elevation of the interior partly broken away; this view is seen along a line perpendicular to the gate.
Fig. 9 is a view taken from the same position as Fig. 8, showing the relation of the gate, when down, to other parts.
Fig. 10 is front elevation partly in section, showing the stops 156 and studs 126.

In Fig. 6 the relation of the gate to the member 76, when the pedal is in normal position, is shown to the best advantage; the relation of the gate to the member 76 when the pedal is down, is best shown in Fig. 3^A. The stroke of the gate is the same at each operation of the pedal.

The pedal is a rectangular frame whose ends are secured to a tread 82 by screws 83; it is mounted to swing on the lower tie-rod 84. On the pivots 85, by which the pull rods 80 are attached to the pedal, a secondary pedal, 86, is also pivotally attached. This pedal is formed by two parallel arms bent up from a cross piece 87 to which is secured one leg of a U-shaped weight 88. When the pedal 81 is in normal position the secondary pedal occupies the same plane, the weight 88 resting on the rectangular frame forming the pedal 81; a piece of leather or rubber 89, in the weight, acts as a buffer to deaden the noise when the weight comes in contact with the pedal 81. The normal throw of the pedal is limited by pawls 90, loosely mounted on the upper tie rod 84, and by feet 91 at the lower ends of the legs. The pedal is lifted by springs 92.

The frames 53 and 54 have hubs 100, in longitudinal alinement with the holes in which pivots 57 oscillate, these holes extending through said hubs. Short shafts 101 are placed in these holes and held therein by set screws 102. A sectoral spider, 103, is mounted on the shaft 101 carried by frame 53, and a similar spider, 104, is mounted on the shaft 101 carried by frame 54. The opposing faces of these spiders have annular grooves 105, near their peripheries, in which a curved plate 106 is carried; hook bolts 107 pass through holes in the spiders and, hooking into holes in the plate 106, draw the plate firmly into the grooves, the spiders and plate thereby forming a light but rigid structure whose function will be presently disclosed. The spiders 103 and 104 have rearwardly extending arms, 108 and 109 respectively, each of which has a lateral projection 110, each projection in turn carrying an arm 111. Screws 112 pass through holes in the wall 56, and screw into tapped holes in arms 111, stiff compression springs, 113, being interposed. The arms 108 and 109 have enlarged ends 114, the lower portions of which are adapted to engage lugs 115, formed on frames 53 and 54, and limit the movement of the arms in one direction. Tension springs, 116, are attached to each enlarged end 114 and their other ends are attached to the legs.

Figure 5:
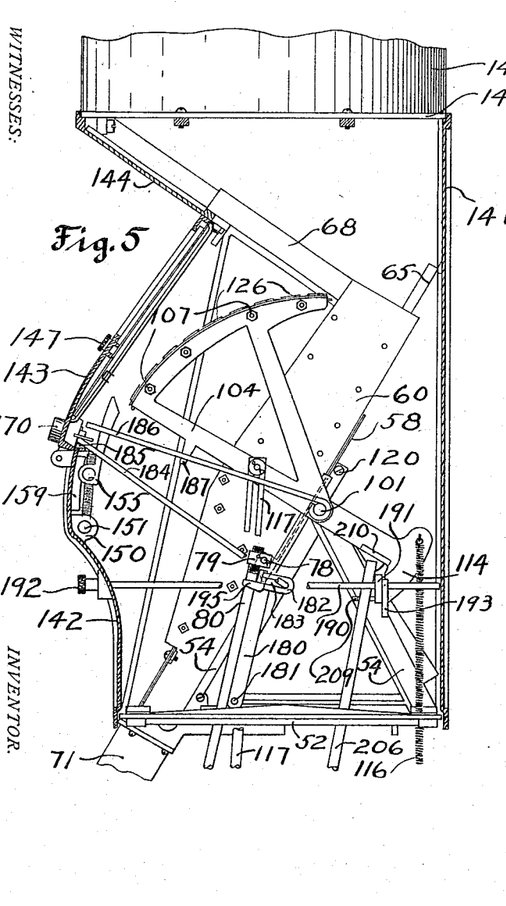
Fig. 5 is an enlarged side elevation of the body of the machine, the cabinet being shown in section.

Pull rods 117 connect the spiders with the secondary pedal, a slot and pin connection being used at their upper ends. The springs 116 should have sufficient strength to overcome the preponderance of weight in the spiders and the plate 106, and the parts carried by them, whereby, when the pedal is raised to its normal position, the plate and spider will be raised to the position shown in Figs. 5 and 6. The weight 88 must be so heavy that, when the pedal 81 is pushed down, the secondary pedal will move in unison with it; therefore the weight must be sufficient to overcome the balance of power in the springs 116. With these conditions fulfilled it is obvious that if the pedal is pressed down, the plate 106, meeting no obstruction, will continue to move as long as the pedal moves, and it is equally obvious that the wall 56 will move in unison with the plate 106.

Figures 20, 21, 22, 23:
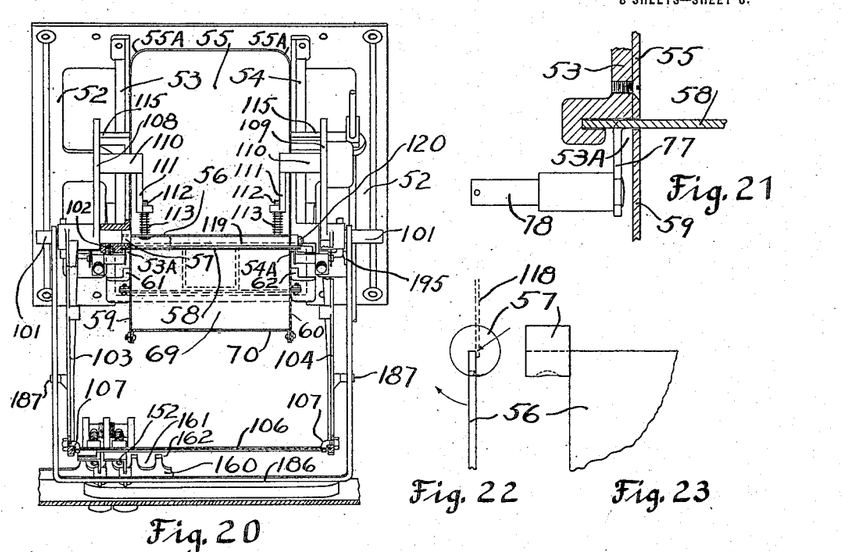
Fig. 20 is a view looking downward on a line parallel with the gate.
Fig. 21 is a detail showing the relative positions of the gate, varimeter and varimeter frame.
Figs. 22 and 23 are details of the movable wall.

Referring to Fig. 22, the corner of the wall 56, indicated by an arrow, will be seen to be exactly at the axis of the pivot 57, and in Fig. 23 it will be seen that the upper edge of the wall does not extend above that point. It is therefore clear that the corner indicated will remain immovable when the wall 56 is swung on its pivot in the direction of the curved arrow, or when it is returned to the position shown. Consequently a plate 118, shown in dotted lines in Fig. 22, may lie against the wall, even be pressed against it, and not be moved when the wall is rotated through an angle of 90 degrees. Therefore, no friction will be created between the two plates, and consequently no wear will take place. The plate 118 is supported by the square rod 119, see Fig. 6, the latter in turn being carried by and acting as a spacer between the frames 53 and 54, to which it is secured by screws 120. The plate 118, called hereinafter the stationary wall, acts as an extension to the wall 56, called hereinafter the movable wall, and by exerting a slight pressure against it, insures a tight joint while permitting freedom of movement by the movable wall. The gate 58 passes approximately midway between the plate 65 and the stationary wall, and clears the rod 119 by a small margin. The relative positions of the parts when the movable wall has been partially rotated is clearly shown in Fig. 4$^A$, except that the gate is shown in this figure in an abnormal position, for reasons to be presently explained.

Figures 11, 12, 14, 15, 16, 17, 18, 19:
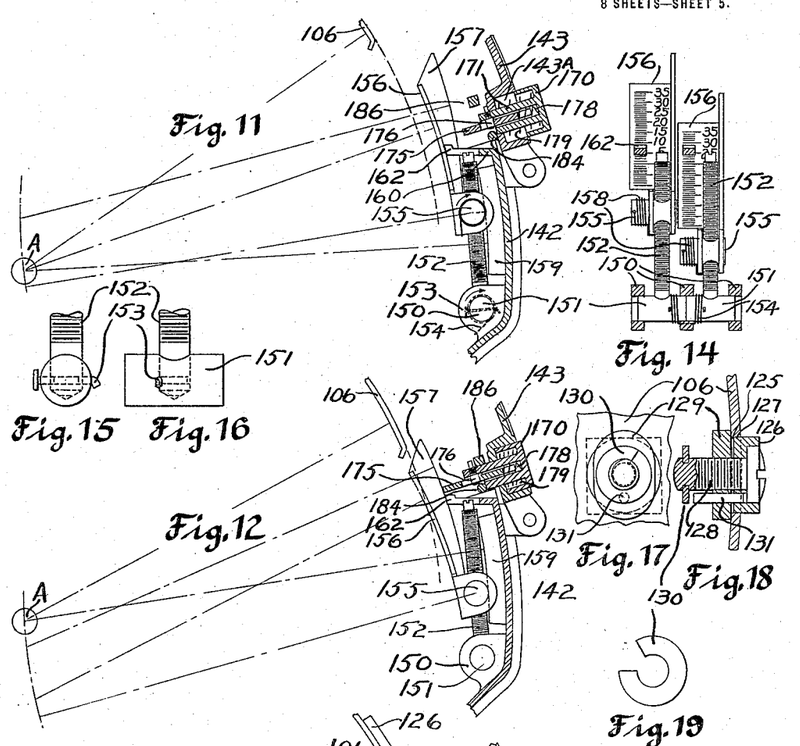
Figs. 11, 12 and 13 illustrate the stop action in various positions.
Fig. 14 shows the detailed construction of the stops and associated parts.
Figs. 15 and 16 are details of parts associated with the stops.
Fig. 17 is a rear view of the stud.
Fig. 18 is a longitudinal section of the stud.
Fig. 19 is a detail of the washer which forms the flange on the stud screw 128.

The plate 106 has apertures 125, adapted to receive removable studs 126. In the present machine there are ten annular rows of nine apertures each. The construction of the studs is best shown in Figs. 17 and 18, wherein the square portion 126 has a cylindrical shank 127, adapted to fit in the aperture 125. The stud is drilled and counterbored to receive a screw 128, which screws into a tapped hole in the yoke 129. This yoke is oval in outline, narrower than the apertures 125, and when the screw is backed out a suitable distance the yoke may be passed inward or outward through the apertures; see Fig. 18$^A$. The end of the screw has an annular groove, into which a split washer 130 is pressed, thereby closing the gap in the washer and making it practically a flange; this washer prevents the screw being backed out beyond the requisite amount. A loose fitting pin 131, lying in holes in the yoke and stud, prevents rotary movement of one with reference to the other; the pin is kept from falling out by the screw head and washer.

Figure 31:
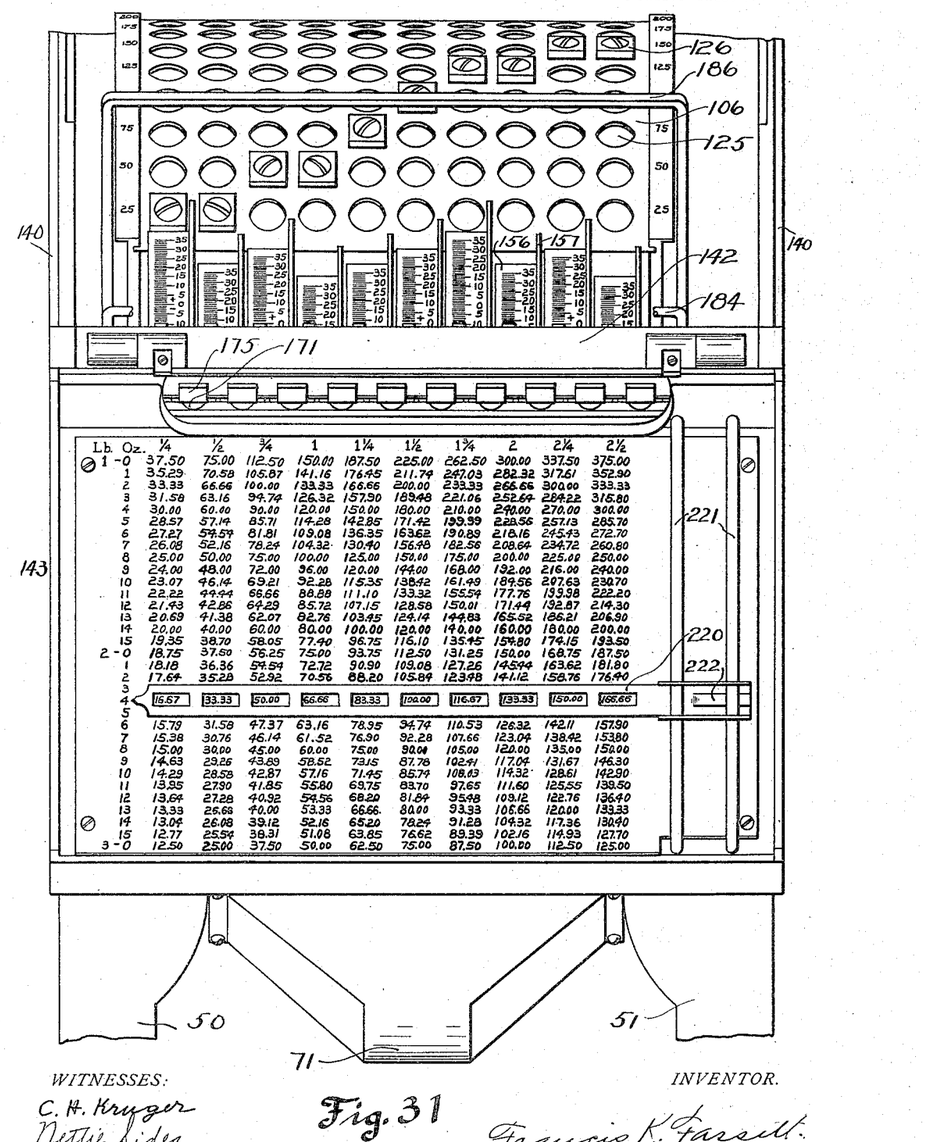
Fig. 31 is a front view of the machine with the lid open.
Figure 32:
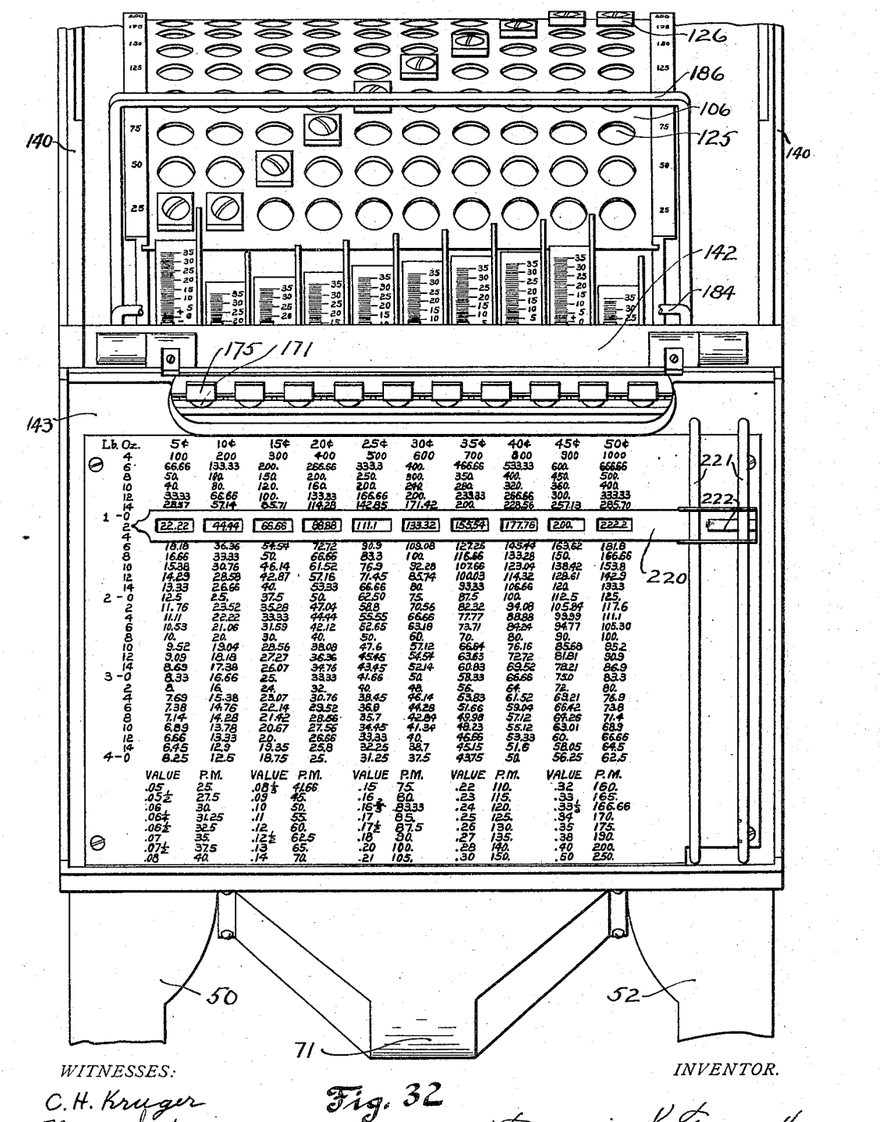
Fig. 32 is also a front view of the machine with the lid open and showing a modified form of computing table.

The cabinet is composed of side plates 140, a back 141, lower front 142, lid 143 and upper front 144. The storage receptacle 145 is preferably cylindrical, and its lower end is secured to a frame 146, resting on the top of the cabinet and acting as a cover for the portions not covered by the receptacle. The lid is hinged to the lower front and opens downward as seen in Figs. 6, 31 and 32. When closed the lid is secured by a suitable latching mechanism, operated by the knob 147. The panel in the upper part of the lid is filled by a glass, a suitable removable backing facilitating the insertion of a display card behind the glass.

The lower front has a row of lugs 150, each having a hole drilled in it, these holes being in longitudinal alinement with each other. A succession of short shafts, 151, are placed in said holes, each shaft being long enough to extend from the center of one lug to the center of the next. Each shaft has a blind hole, and a small hole perpendicular to the axis of the blind hole, the latter encroaching on the larger hole about half the diameter of the smaller one. A round rod, 152, having a groove turned near one end, is carried by each shaft 151, the grooved end being in the blind hole; a pin 153 passes through the aforesaid small hole and through the groove, preventing the rod getting out of the hole, but permitting rotary movement of the rod. The other end of the rod is reduced in diameter and has a slot to receive a screw driver; the rod is threaded nearly to the shaft 151. In the present machine there are ten rods and as many shafts 151; these are arranged in pairs, with the pins 153 of each pair placed in proximity. A double coiled spring, 154, straddles the lug 150, see Fig. 14, and one of its free ends is hooked on each one of the pins 153; this arrangement of the spring permits independent action of each shaft 151, the action in all cases being such as to tend to rotate the shafts in the direction of the arrow on the lug 150, Fig. 11. Mounted on each rod 152, called hereinafter an adjusting screw, is a shaft 155 having a tapped hole adapted to receive the screw. A stop 156 is carried by each shaft 155; a coiled spring 158 anchored in a small hole drilled in the shaft tends to rotate the stop in the direction of the arrow on the stop in Fig. 11. The stops have graduations ranging from 0 to minus 10 and from 0 to plus 35. These will be again referred to presently.

On the inside of the lower front there is a row of inwardly projecting ribs 159, having arcual faces, the centers thereof being in longitudinal alinement with the axes of shafts 101. These ribs are directly behind the adjusting screws; springs 154 are adapted to rotate the shafts 151 and keep the shafts 155 pressed against the ribs 159 at all times. The upper edge of the lower front has an inwardly turned flange 160, in which a succession of notches 161 are formed; in each one of these notches the head of an adjusting screw appears, where it is easy of access. The portions of the flange remaining, form points 162, which act as guides for the keys to lie against, the stops being pressed against them by the springs 158, and also as indexes by which to set the stops to the graduation desired. Fig. 14 shows the relation of the points to the graduations, the two stops in this figure being set at 9 and 29 respectively. The strength of springs 154 should be greater than that of springs 158, as the former have to oppose the latter to a certain extent.

Figures 13, 18:
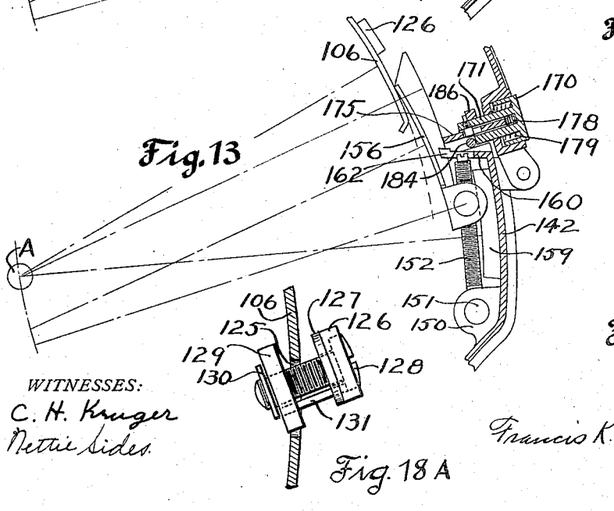
Figure 14A:
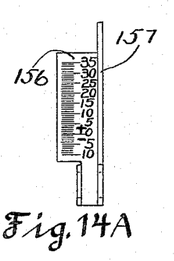
Fig. 14A is an elevation of a stop detached from its surroundings.
Figures 24, 25:
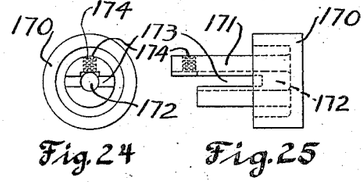
Figs. 24 and 25 are an end and side view of the push button.
Figure 26:
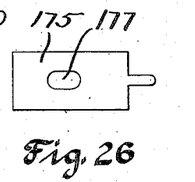
Fig. 26 is a plan view of the equalizer.

The lid carries a row of push buttons 170; these being identical, a description of one will describe all. The button, see Figs. 24 and 25, is cup shaped, and from the bottom of the cup a shank 171 projects. The shank has a central bore 172; a slot 173 bifurcates the major portion of its length. One limb of the bifurcated shank is longer than the other and has a transverse tapped hole 174. A plate 175 is adapted to lie in the slot 173, and is kept in place by a screw 176 passing through a slot 177 in the plate 175, said slot permitting a limited longitudinal movement of the plate. A compression spring 178, see Figs. 11, 12 and 13, in the bore 172, surrounds a small extension on the plate 175 and tends to move the latter outward. The buttons are carried in suitable recesses 143$^A$, formed in the lid 143, the shanks passing through holes in the bottoms of the recesses. Compression springs 179 tend to move the buttons outward, this movement being limited by the ends of the screws 176, which protrude from the shanks 171. Each button is located in a position where its plate 175 can engage one of the stops 156, the flange 157 being the part of the stop engaged. The outer edge of the flange 157 is arcual, but is eccentric with reference to the curvature of the stop itself. Referring to Fig. 11 the center of the stop and of the rib 159 meet at A, while the center of the flange 157 is above A, on an arc struck from the axis of the shaft 155. In Fig. 12, the centers of both parts of the stop are below the center A, on an arc struck from the axis of shaft 155, but the same distance apart as they are in Fig. 11. In Fig. 13 the center of the flange meets that of the rib at A, which in this and the other views is in longitudinal alinement with the shafts 101.

Fig. 11 shows the normal position of all the parts, while in Fig. 12 the button has been pushed in; this has thrown the stop into the path of plate 106, which is indicated by the dotted line. In this view, the plate 175, called hereinafter the equalizer, is in its extended position, the spring 178 having overpowered the spring 154. In Fig. 13 the spiders have been rotated and the plate 106 has forced the stop backward, the equalizer spring 178 having been forced to yield to permit the retraction of the equalizer. A stop may be set at any graduation by turning the adjusting screw, the shaft 155 moving up or down on the screw according to the direction in which it is turned, but being pushed at all times against the rib 159, as has been described. The stop being arcual, and lying against the point 162, its movement is also around the center A. From the foregoing it will be seen that though the adjustment of the stop is made with a straight screw, the graduations may be uniform in length. Access to the keys is obtained by opening the lid of the cabinet.

Figure 27:
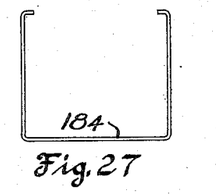
Fig. 27 is a plan view of the unlocking rod.

A locking lever 180 is secured to each end of a rock shaft 181, the latter being journaled in suitable bearings formed in the frames 53 and 54. See Figs. 3ᴬ and 6. The upper ends of the locking levers are normally in the paths of blocks 79 and are adapted to prevent the pedal being operated. A spring, not shown but which may be coiled around the rock shaft 181, tends to keep the locking levers in the paths of the blocks at all times. Each lever has a lateral projection 182, having a slot 183. A rectangular frame 184, see Figs. 7 and 27, is connected to the locking levers, the short inwardly turned ends of the frame lying in the slots 183. The front portion of the frame, which I call the unlocking rod, rests upon inclined lugs 185, formed on the lower front 142, bringing it in the path of the short limbs of the button shanks 171.

A second frame 186, somewhat like the frame 184, and called the button lock, has its free ends bent to form rings, which are mounted on the shafts 101. Each spider has a depending member with a lateral projection 187, on which the frame 186 rests when the spiders are in their normal positions—see Figs. 5 and 6; at such times the frame is held high enough to permit the ends of the screws 176 to pass beneath it. See Fig. 11. Should the unlocking rod or the frame be found in the way when the keys are being set, they may be lifted up out of the way, each being pivotally mounted.

The operation of the machine is as follows: Assume that the stops have been adjusted to suit the commodity contained in the receptacle 145, and that a given amount of the commodity is wanted. The push button whose symbol represents the desired amount is pressed in and the pedal pushed down as far as it will go. Pressing in the push button did two things: first, it pushed the frame 184 backward, the frame in turn swinging the ends of the locking levers clear of the blocks 79, thereby unlocking the machine and permitting the pedal to be pushed down; second, the equalizer in the push button engaged a key and thrust its free end into the path of the plate 106. As the pedal descends, the secondary pedal, impelled by the weight 88, rotates the spiders on the shafts 101, and at their first movement, the button lock drops down in front of the screw 176 of the push button pressed. The position of the push button and associated parts at this time is shown in Fig. 12, from which it is seen that pressure is no longer required to hold the push button in its depressed position, the button lock being ready to perform that office, as in Fig. 13. When the plate 106 engages the stop 156 it cams the stop outward, the end of the stop lying against the plate as it continues to move. Presently a stud 126 engages the end of the stop and checks the movement of the plate 106, the spiders, and the rods 117, and as the pedal continues to descend, the secondary pedal, pivotally attached to the rods 117, rocks on said pivots and lifts the weight 88. The wall 56 having moved in unison with the spiders and plate, when the stud 126 engages the stop the capacity of the varimeter, i. e., the space between the wall 56 and the gate 58, will be such as to contain the required amount of the commodity. When the pedal is clear down the top of the gate will be about even with the upper edge of the member 76; see Fig. 3ᴬ. Referring to this figure it will be seen that the commodity chute is open into the varimeter, while the gate cuts off the varimeter from the lower chute. Experience has shown that the varimeter will fill instantly upon its being connected to the commodity chute; therefore the pedal may be immediately returned, and as it returns the upper edge of the gate plows through the commodity, cutting off the varimeter from the commodity chute. It will be observed that there is a space between the plate 65 and the stationary wall 118, and as the gate ascends it enters this space about midway between the plate and wall, which arrangement prevents the possibility of grains of the commodity getting crosswise between the upper edge of the gate and the plate 65 and obstructing the movement of the gate. Experience has shown that the commodity will not flow up into this space; in fact the level of the commodity will practically coincide with an imaginary line drawn from the lower edge of the plate 65 to that of the stationary wall 118.

The length of the gate is such that its upper edge will reach above the level of the commodity in the space referred to, when its lower edge is even with the lower edge of the varimeter; therefore the supply is completely cut off before the gate in its ascent opens the varimeter into the lower chute. As no commodity can flow into the lower chute till the gate uncovers the lower part of the varimeter, it follows that the gate must nearly complete its upward movement before the commodity can be discharged from the varimeter, and on this account the connection between the rods 117 and the spiders is made with a slot and pin. This will be understood by reference to Figs. 3 and 3ᴬ, the latter showing the position of the wall 56 when the other mechanism is in the position shown in the former.

It is clear that as the pedal moves upward the rods 117 will remain stationary till the weight 88 comes to rest on the pedal. Then as the pedal continues to lift, the rods 117 will be lifted; as the movable wall 56 cannot move, the varimeter being full of commodity, the slots in the upper ends of the rods will slide on the pins, and in this way the pedal is permitted to continue upward, the gate finally opening the varimeter and permitting the commodity to be swept into the lower chute, the springs 116 furnishing the motive power. Shortly before the sectors are stopped by the lugs 115, the projections 187 on the spiders lift the frame 186, thereby releasing the push button and incidentally permitting the locking levers 180 to swing into the paths of the blocks 79.

Referring to Fig. 12, it will be observed that there is a space between the screw 176 and the frame 186, indicating that the button is pressed farther in than the frame is capable of holding it. The adjustment of the locking levers 180 with reference to the blocks 79 is such that the levers will not permit the passage of the blocks unless the push button is pressed farther in than the frame 186 will hold it. In other words, to unlock the machine a push button must be pushed in as far as it will go, after which the pedal may be started down. When no push button has been pushed in, the pedal may be moved a short distance before the blocks 79 engage the ends of the locking levers, this movement being sufficient to permit the button lock to drop into position for locking the keys. At any time after the blocks 79 have passed the ends of the locking levers the push button may be relieved of external pressure, when it will move outward till stopped by the button lock. The object of requiring the push button to be pressed in beyond the point at which the button lock will hold it, is to make sure of the button lock falling into place behind the screw 176, thereby insuring that the button is held in. If this safeguard were not provided, there might be times when the button lock would catch on the end of the screw, instead of falling behind it, and should this occur, when the button was relieved of external pressure it would spring out. Should this happen, there being no key in the paths of the stops 126, the wall 56 would continue to move as the pedal moved and there would be an excessive amount of commodity discharged from the machine. The button lock not only locks the depressed button in, but it locks all the others out as long as the pedal is depressed.

In certain kinds of service it may be desirable to measure two or more like quantities in succession, and to avoid having to press the same button repeatedly, I provide means whereby the machine may be operated without releasing the depressed button. This means comprises a rock shaft 190 supported at one end by a projection 191 formed on the frame 54, through which it passes, its other end being provided with a knurled knob 192 adapted to rotate in a suitable boss formed on the lower front 142. A block 193 is pinned on the shaft close to the projection 191, the normal position of the block being that shown in Figs. 4, 5 and 10. When the machine is to be operated repeatedly the knob 192 is rotated in the direction indicated by an arrow in Fig. 10, after the pedal has been pushed down the first time and while it is still down. The knob is turned until the block 193 comes to rest on the lug 115, as in Fig. 7. The block being thicker than the lug 115, it engages the extension 114 on the spider 104, thereby stopping the return movement of the spider 104 earlier than the lug 115 would stop it, and early enough to prevent the projection 187 lifting the button lock to release the button. As the spiders 103 and 104 are rigidly united by the plate 106 stopping 104 also stops 103.

It has been stated that to unlock the machine and permit depression of the pedal, a button must be pressed in farther than the button lock; therefore, since the button is held in by the button lock, it is obvious that after the first operation, though the button is not released, the locking levers will engage the lugs 79 and prevent the next operation of the pedal. To prevent this the locking levers must be held out of the paths of the blocks 79 by other means. For this purpose a pin 194 is carried by the shaft 190, which, as the block 193 is thrown into position for repeated operation, engages a lug 195 carried by the adjacent locking lever, and cams the lever back far enough to prevent it engaging the block 79. As both locking levers are secured to a rock shaft, restraining one, also restrains the other.

Figure 30:
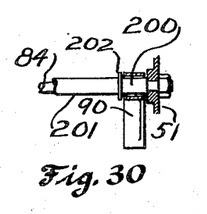
Fig. 30 is a detail of the upper tie rod construction.

As before stated the upward movement of the pedal is limited by the pawls 90, loosely mounted on the upper tie rod 84. This tie rod is incased in three pieces of tubing, see Fig. 30, two short pieces 200 and a long piece 201, washers 202 separating the several lengths. Nuts screwed on each end of the rod clamp the tubes and washers between the legs 50 and 51. The pawls 90 slip loosely over the lengths 200 and are kept in place by the washers 202. Normally the pawls 90 hang down and lie against the lugs 203 formed on the legs. Should it be desired to remove the commodity from the machine, but not measure it as it is removed, the pawls 90 may be rotated on the tie rod and caused to lie against the lugs 204, as in Fig. 4. The pedal may then be lifted to the position shown in this figure, and held up by the hook 205. The gate will then be in the position shown in Fig. 4A, wherein the varimeter is at once in communication with the upper and lower chute. The lower end of a rod 206 is arranged to slide in a lug 207 formed on the leg 51, a pin 208 limiting the downward movement of the rod. In normal action the pedal does not engage this rod, see Fig. 1, but when the pedal is lifted as in Fig. 4, it lifts the rod with it. The upper end of the rod passes through a suitable guide 209, and when it is lifted by the pedal, engages a lug 210 carried by the arm 109 of the spider 104, and rocks the spider (and of course the other spider) into the position shown in Fig. 4; when in this position the wall 56 will be in the position shown in Fig. 4ᴬ. Referring to this figure it will be be seen that commodity can flow from the upper chute into the varimeter and thence directly into the lower chute. When all the commodity has left the receptacle 145 and the upper chute there will be a small amount remaining in the varimeter, which will be swept out by the wall 56 when the pedal is restored to its normal position.

It has been shown that the capacity of the varimeter is variable; the means for varying its capacity and for checking the variation, has been explained. The basal element of the machine is this compartment of variable capacity. While any suitable unit of measurement may be used to express the capacity of the measuring compartment, the cubic inch has been adopted in the present machine, and the graduations on the stops represent cubic inches.

The perimeter of each spider bears a series of numerals, one of said numerals being opposite each longitudinal row of holes in the plate 106. These numerals represent cubic inches, i. e., the capacity of the varimeter in cubic inches will be equal to the numeral opposite a stop, plus the reading on the stop which engages said stud. For example; to set a stop for 40 cubic inches, the stop must be set at 15 and its stud set in the first row. Should a setting of 19 cubic inches be required, the stud will be placed in the first row, and the stop set at minus 6. While the minus end of the stop is intended principally for capacities of less than 25 cubic inches, it may be found a convenience if by setting the stud in a row of higher denomination a few turns of the adjusting screw will effect the setting. It is seen, therefore, that the means for setting the machine is dual; that it is a duad. This dual setting arrangement has some decided advantages. While the perforated gage plate affords opportunity for a number of changes, the range of this method is necessarily limited. On the other hand, a stationary stud might be placed on the gage plate and all adjustments made with the key. For structural reasons, however, this is not practicable, and, furthermore: to turn the screw far enough to make an extensive change in the setting would require too much time. Each component of the duad, though in itself of limited adaptability, supplies the deficiency of the other. This mutuality, therefore, renders the adjusting scheme something more than a mere double adjustment.

From the foregoing it is obviously a very simple matter to set the stop so that the compartment may be made to have any desired capacity. But it is not so simple a matter to determine what capacity you want the compartment to have. The well known standards of dry measure might be used if we are satisfied to measure pints, quarts, etc., but this would not only confine the machine to a field of very narrow limits, as there are comparatively few commodities handled by dry measure, but measurements based on those standards would be only approximately correct. Take oats or shelled corn for example; though these are sometimes sold in small lots by dry measure, they are usually sold by weight, 32 lbs. of the former and 56 lbs. of the latter being called a bushel. A bushel is supposed to contain 2150.4 cu. in., but if two lots of corn, each weighing 56 lbs., one lot being of a grade inferior to the other, or, even if they were of the same grade but belonging to different lots, were measured, it is doubtful if either lot would measure 2150.4 cu. in., and much more doubtful if they would measure the same number of cubic inches. This is not a condition peculiar to corn; it is as true of coffee, rice, beans and other commodities. It is a well known fact that the relative weight and bulk of all granular commodities varies, and it is impossible to compile a table giving the comparative weights and volumes of such commodities with more than approximate accuracy. The foregoing being true, and in view that the principal field for my machine lies in handling commodities that are handled by weight, it becomes necessary to devise means whereby the relation between weight and bulk in the commodity to be handled may be accurately ascertained. Such a device will now be described.

On the inside of the lid, Fig. 31, below each stop there is a table of numerals representing capacities, in cubic inches, attainable by the measuring compartment. It will be noted that the maximum readings on the stop in this figure are less than some of the volumes given in their respective tables. While the range of adjustment of the stops could be made greater by the simple expedient of lengthening the stops and their adjusting screws, the dual system of adjustment, already described; i. e., moving the studs for adjustments of 25 cu. in. and multiples thereof, and making the fractional adjustments with the screws, is preferred because of the time thereby saved. For the same reason the first row of holes in plate 106 is made to represent 25 cubic inches, although another row could be added, representing 0. Should this be done, the minus 10 graduation on the stops could be 0, which, without increasing the proportions of the stops shown in the drawings, would make the capacity attainable by stop adjustment alone, 45 cubic inches. In view of this, and in view of the fact that the range of adjustment of the stops can be increased by the means already indicated, when, hereinafter mention is made of setting a stop for a capacity greater than is attainable by the keys shown in the drawings, it will be understood to mean either that the stops have the requisite range of adjustment, or, that an adjustment effected by a stud and a stop is considered to have been made by the stop.

Each table of volumes in Fig. 31 is headed by a symbol of import, corresponding with the character on the push button for that particular stop. In the present case these are $\frac{1}{4}$, $\frac{1}{2}$, 1, $1\frac{1}{4}$, $1\frac{1}{2}$, $1\frac{3}{4}$, 2, $2\frac{1}{4}$ and $2\frac{1}{2}$, all of which represent pounds or fractions thereof. At the extreme left of the tables there is a column of numbers representing weights. A shield 220, is mounted in suitable guides and adapted to be moved across the faces of the tables. This shield has a series of sight openings adapted to simultaneously expose one number in each table when the pointed end of the shield is opposite one of the weights in the left hand column.

The first step in setting the machine, after the commodity has been placed in the receptacle 145, is to set a stop at 150. This is done by placing the stud in the sixth row and setting the stop at 0. 150 cu. in. of commodity is then measured out and weighed. Suppose it weighs 2 lbs. 4 oz.: moving the shield to a position where its pointed end is opposite 2 lbs. 4 oz. the setting number for each stop will be seen through the sight opening belonging thereto. These in the present case, will be 16.67, 33.33, 50, 66.66, 83.33, 100, 116.67, 133.33, 150 and 166.66.

From the foregoing it will be seen that the machine has been set according to the actual relative weight and bulk of the particular commodity contained in the receptacle 145; that it has been set without any calculation having been made by the person doing the setting, who may have no arithmetical skill save the ability to read numbers; that the number representing the capacity for which each stop had to be set appeared immediately below the stop, and as only one number was there exposed the opportunity for error was reduced to the minimum; that the preliminary measurement, on which the setting of the machine was based, was made in the same compartment in which the subsequent measurements will be made, thus avoiding the probability of error which would exist if the preliminary measurement were made in a compartment having a different shape from that of the compartment wherein the subsequent measurements are made; that the preliminary measurement was made under the same conditions: i. e., conditions affecting the compactness with which the commodity filled the compartment, as will prevail in subsequent measurements; that the method employed for determining the relative weight and bulk of the commodity, i. e.; weighing a quantity of known volume, is a practical, simple and perhaps the only reliable means by which the relative weight and bulk could be determined.

The table in Fig. 31 was computed by the formula $$\frac{Vw}{W} = v,$$

in which V=volume in cubic inches of the preliminary measurement, and W its weight in ounces; w=quantity in ounces a key is to be set to deliver, and v=the volume of said quantity in cubic inches. In this table V=150. Obviously, some other number might be used in computing the table, but whatever number is used, that number becomes a constant and the preliminary measurement must always contain that number of cubic inches.

Figure 2:
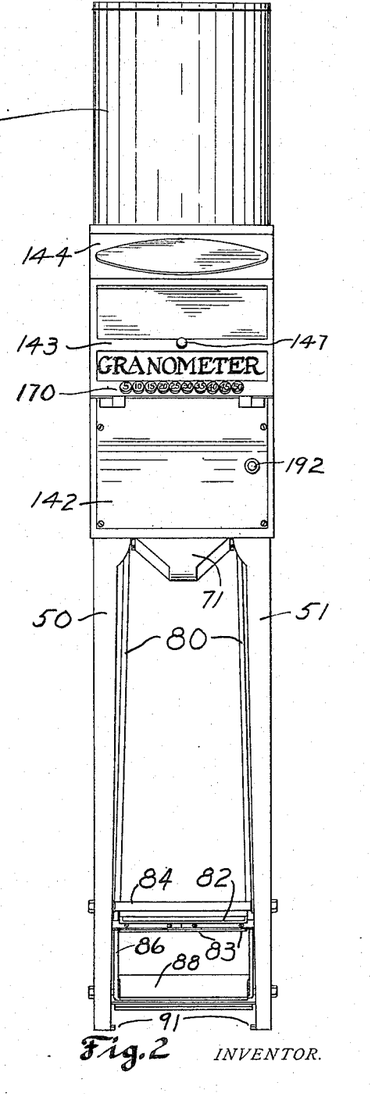
Fig. 2 is a front elevation.

It is not essential that the symbols of import represent weight; they may, for example, represent intrinsic value. In Fig. 2 the push buttons are marked 5, 10, 15, 20, 25, etc., which numbers represent cents. Fig. 32 shows a machine, wherein the tables are headed by symbols representing monetary values corresponding to those shown in Fig. 2. The numbers in the tables represent volumes, and the column at the left weights, as before. Using our former example, a commodity wherein 150 cu. in. weighed 2 lbs. 4 oz., and shifting the shield 220 to 2 lbs. 4 oz., we find 11.11 cu. in. exposed in the 5 cent table, 22.22 in the 10, 33.33 in the 15 and 44.44 in the 20 cent table, showing those volumes will be worth 5, 10, 15 and 20 cents respectively. Without knowing the basal value of the commodity, it is obvious that were it half as great it would have required just twice as much of the commodity, to wit, 22.22, 44.44, 66.66 and 88.88 cu. in. to be worth 5, 10, 15 and 20 cents respectively. It is equally obvious that had the preliminary measurement contained just half as many, to wit, 75 cu. in., the weight, instead of being 2 lbs. 4 oz., would have been 1 lb. 2 oz. Shifting the shield to 1 lb. 2 oz. we find the volumes correspond with those last mentioned, to wit, 22.22, 44.44, 66.66 and 88.88.

In other words, by making our preliminary measurement just half as great, we find the volumes necessary for a commodity of half the value of the first; from which it is obvious that by varying the number of cubic inches in the preliminary measurement in proportion to the variation in the value of the commodity, we can use these tables for commodities of various values. To facilitate this, an auxiliary table is placed below the stop tables, giving the number of cubic inches required in the preliminary measurement of commodities valued at various prices per pound. This table contains columns of numerals representing cents, the columns being headed by the word Value. Opposite each of these numerals, in parallel columns, is a numeral representing cubic inches; these columns are headed P. M., which is understood to mean that each numeral below represents the volume required in the preliminary measurement when one pound of the commodity concerned is valued at the number of cents indicated by the numeral opposite.

The table shown in Fig. 32 is calculated by the formula $$\frac{V}{WPA} = v,$$
$$16$$

in which V, W and $v$ represent the same elements as in the former formula, while P=value of one pound in cents, and A=number of cents' worth the quantity is to contain. In this table P=30, and V=150. If desired, a separate table may be prepared for each price at which commodities are likely to be sold, while, as already explained, the auxiliary table makes the single table of universal application.

It is now clear that my machine is a computing as well as a measuring machine: i. e., it computes the quantity of a given commodity which is required to represent a given value. Suppose a commodity is worth 13½ cents per pound: a dealer could not sell one pound at that price. He could, however, sell fourteen cents' worth, or better still fifteen cents' worth, since in many parts of the country one cent coins are not much used. There are many successful dealers without sufficient arithmetical knowledge to figure just how much more than one pound he should give for fifteen cents, and even if he could figure it out the ordinary scale, which weighs in pounds and ounces, would not be adapted to weigh the commodity correctly. But my machine, with the several keys set in the manner described measures out the required amount of commodity regardless of its price per pound.

The manner of using the tables shown in Fig. 32 will now be readily understood: a commodity being worth 27 cents per pound, the numeral opposite 27 cents is found in the auxiliary table to be 135. A stop is set at 135, that quantity of the commodity measured out and found to weigh two pounds. Moving the shield 220 to 2 lbs. 0 oz., each stop is then set according to the numeral seen through the sight opening belonging thereto. That is, the 5 cent stop will be set at 12.5, the 10 cent stop at 25, the 15 cent stop at 37.5, etc. Although an inversion of the use of this auxiliary table, we find upon inspection, that 150 cu. in. and 75 cu. in. are the preliminary measurements required for commodities valued at 30 cents and 15 cents per pound respectively. Manifestly this table can be used for any commodity, regardless of its relative weight and bulk, or its value, while the results found are based upon the characteristics of the particular commodity to be measured. The possibility of an error occuring in the setting is, as already pointed out, almost entirely eliminated. The graduations are not adapted to set the stop as close as the decimal fractions given in the tables. They can however, be divided by the eye and the stop set within one quarter of one cubic inch of the required volume.

The wall 56 is preferably made with a bend at about its center, as shown in the several views. Referring to Fig. 6, it will be seen that the upper portion of the wall lies parallel with the gate, 58, while the lower end protrudes beyond the edge of the varimeter. As has been explained, when the machine is being used repeatedly, the homeward movement of the spiders is limited slightly by the block 193; in order to entirely clear the varimeter at each operation, the wall must sweep to its edge, and if it does so when the repeating mechanism is in use, it will extend beyond the varimeter in normal operation. If the wall were flat it would approach very close to the lower edge of the gate at the end of a normal operation, a dotted line in the figure referred to showing the condition which would exist, and grains of commodity, such as lima beans, might be trapped between the gate and the wall, thereby preventing the spiders completing their homeward movement and preventing the release of the push button. The bend in the wall prevents such trouble occurring. The back of the cabinet may be removed, giving access to the screws 112, the ends of which are slotted to receive a screw driver; turning these screws increases or diminishes the capacity of the varimeter, which may thereby be accurately adjusted.

Figure 28:
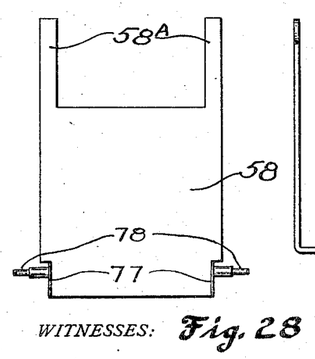
Fig. 28 is a modified form of gate.
Figure 29:
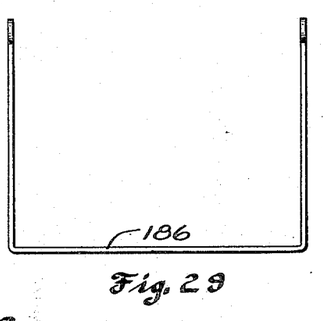
Fig. 29 is a plan view of the stop lock.

By reference to the several figures concerned, but more especially Figs. 3ᴬ and 21, it will be seen that when the gate is in its lower position there are openings between the edges of the varimeter and the plates 59 and 60. While, by making the gate of thin metal, this space may be but a mere crack, it is possible for very small grained commodities to leak through the openings. To prevent this, the gate may be made with upwardly projecting extensions 58ᴬ, see Fig. 28, which, when the gate is in its lowest position will extend upward as far as the pivot 57, or a little higher if preferred. These extensions will effectually close the cracks referred to. When the gate is in its normal position there are similar openings below the gate, but as commodity which may leak out at these openings has been measured, there is no objection to this leakage. A sort of trough, 53ᴬ, is formed between the frame 53 and the plate 59, which is clearly shown in Fig. 21. This and a similar trough, 54ᴬ is also seen in Figs. 8, 9 and 20; the trough 54ᴬ is also shown in Fig. 10. Owing to the inclined positions of these troughs and the fact that they terminate over the flared portion of the spout 71, all commodity which leaks out at the openings referred to is conducted to the spout and discharged along with the other commodity.

While the forms of mechanism herein shown and described constitute a preferred form of embodiment of the invention, it is to be understood that other forms might be used, all coming within the scope of the claims which follow.

What I claim is as follows:—

1. In a measuring machine, the combination of a measuring compartment, means for varying its capacity, means for checking the variation thereby effected when the compartment has attained a predetermined capacity, means for adjusting said checking means, and means which indicates the capacity for which said checking means is set.

2. In a measuring machine, the combination of a measuring compartment, means for varying its capacity, means for checking the variation thereby effected when the compartment has attained the selected one of two or more predetermined capacities, means for adjusting said checking means, and means which indicates the capacity for which said checking means is set.

3. In a measuring machine, the combination of a measuring compartment, means for varying its capacity, a plurality of checking means, each adapted to check the variation thereby effected when the compartment has attained a predetermined capacity, means for adjusting each of said checking means, and means which indicate the capacity for which each checking means is set.

4. In a measuring machine, the combination of a measuring compartment, means for varying its capacity, a plurality of manually actuated checking means, each adapted to check the variation thereby effected when the compartment has attained a predetermined capacity, the said means being normally ineffective, means for adjusting each of said checking means, and means which indicate the capacity for which each checking means is set.

5. In a measuring machine, the combination of a measuring compartment, means for varying its capacity, adjustable means for checking the variation thereby effected, and a graduated scale and index associated with said checking means, the former representing units of volume attainable by the compartment, whereby the checking means may be set so it will check said variation when the compartment has attained a predetermined capacity.

6. In a measuring machine, the combination of a measuring compartment, means for varying its capacity, a plurality of adjustable means for checking the variation thereby effected, and a graduated scale and index associated with each of said checking means, the graduations representing units of volume attainable by the compartment, whereby the several checking means may be adjusted so each will be adapted to check said variation when the compartment has attained a predetermined capacity.

7. In a measuring machine, the combination of a measuring compartment, means for varying its capacity, a plurality of manually actuated adjustable means for checking the variation thereby effected, said means being normally ineffective, and a graduated scale and index associated with each of said checking means, the graduations thereon representing units of volume attainable by the compartment, whereby the checking means may be adjusted so each will, when actuated, check said variation when the compartment has attained a predetermined capacity.

8. In a measuring machine the combination of a measuring compartment, means for varying its capacity, adjustable means for checking the variation thereby effected, a graduated scale and index associated with said checking means, the graduations representing units of volume attainable by the compartment, and characters on said scale representing pluralities of said units of volume, whereby the volume for which the checking means is set may be seen.

9. In a measuring machine, the combination of a measuring compartment, means for varying its capacity, a plurality of adjustable means for checking the variation thereby effected, a graduated scale and index associated with each of said checking means, the graduations representing units of volume attainable by the compartment, and characters on said scales representing pluralities of said units of volume, whereby the volume for which each checking means is set may be easily read.

10. In a measuring machine, a compartment of variable capacity and a device for adjusting it to a given capacity; said device being itself adjustable and provided with an indicator showing the capacity with which it will endow the compartment.

11. In a measuring machine, a compartment of variable capacity, and a plurality of devices, each adapted to endow the compartment with a given capacity; each of said devices being adjustable and provided with an indicator showing the capacity with which it will endow the compartment.

12. A measuring means comprising a measuring compartment, means for varying its capacity, means for checking the variation thereby effected, and dual means whereby the compartment may be made to have a predetermined capacity when said variation is checked.

13. A measuring means comprising a measuring compartment, means for varying its capacity, means for checking the variation thereby effected, and dual means whereby the compartment may be made to have a predetermined capacity when the variation is checked.

14. A measuring means comprising a measuring compartment, means for varying its capacity, means for checking the variation thereby effected, and dual means whereby the compartment may be made to have a predetermined capacity when the variation is checked; one component of the duad being adapted to affect the capacity of the compartment by fixed amounts, and the other to affect it by variable amounts.

15. A measuring means, comprising a measuring compartment, means for varying its capacity, means for checking the variation thereby effected, and dual means whereby the compartment may be made to have a predetermined capacity when the variation is checked, one component of the dualism being means for adjusting the checking means so it will check the variation when the compartment has attained a predetermined capacity.

16. A measuring means comprising a measuring compartment, means for varying its capacity, a plurality of means for checking the variation thereby effected, said means being normally ineffective, dual means associated with each checking means for causing the compartment to have a predetermined capacity when the variation is checked, and means for rendering any one of the checking means effective.

17. A measuring means comprising a measuring compartment, means for varying its capacity, a plurality of means for checking the variation thereby effected, said means being normally ineffective, dual means associated with each checking means for causing the compartment to have a predetermined capacity when the variation is checked, one component of each duad being adapted to affect the capacity of the compartment by fixed amounts, and means for rendering any one of the checking means effective.

18. A measuring means comprising a measuring compartment, means for varying its capacity, a plurality of means for checking the variation thereby effected, said means being normally ineffective, dual means associated with each checking means for causing the compartment to have a predetermined capacity when the variation is checked, one component of each duad being adapted to affect the capacity of the compartment by fixed amounts, the other to affect it by variable amounts, and means for rendering any one of the checking means effective.

19. A measuring means, comprising a measuring compartment, means for varying its capacity, a plurality of means for checking the variation thereby effected, said means being normally ineffective, dual means associated with each checking means for causing the compartment to have a predetermined capacity when the variation is checked, one component of each dualism being means for adjusting the checking means so it will check the variation when the compartment has attained a predetermined capacity, and means for rendering one of the checking means effective.

20. A measuring means comprising a measuring compartment, means for varying its capacity, manually operated means for checking the variation thereby effected, and dual means for causing the compartment to have a predetermined capacity when the variation is checked.

21. A measuring means comprising a measuring compartment, means for varying its capacity, manually operated means for checking the variation thereby effected, and dual means for causing the compartment to have a predetermined capacity when the variation is checked, one component of the duad being adapted to affect the capacity by fractional amounts.

22. In a measuring machine, the combination of a measuring compartment having a portion of its inclosing wall movable with reference to the remainder of said wall, studs mounted to move with said movable wall, the position of said studs with reference to the wall being changeable, and members adapted to engage said studs and check the movement of the wall.

23. In a measuring machine, the combination of a measuring compartment having a portion of its inclosing wall movable with reference to the remainder of said wall, means for moving the wall, and studs mounted to move with said movable wall, the position of said studs with reference to the wall being changeable.

24. In a measuring machine, the combination of a measuring compartment having a portion of its inclosing wall movable with reference to the remainder of said wall, studs mounted to move with said movable wall, adjustable members adapted to engage said studs and check the movement of the wall, and graduations and an index associated with said members, whereby the adjustments thereof may be effected with mathematical precision.

25. In a measuring machine, the combination of a measuring compartment having a portion of its inclosing wall movable with reference to the remainder of said wall, studs mounted to move with said movable wall, adjustable stops adapted to engage said studs and check the movement of the wall, graduated scales on said stops, and a relatively stationary index associated with each stop.

26. A measuring machine for delivering quantities of granular commodity having predetermined weight, comprising a compartment of variable capacity, a device for adjusting the compartment to a given capacity, said device being itself adjustable and provided with an indicator showing the capacity with which it will endow the compartment, and means for determining the capacity required for delivering a given weight of the commodity.

FRANCIS K. FASSETT.

Witnesses:
 NETTIE SIDES,
 W. D. BETTIS.

Copies of this patent may be obtained for five cents each, by addressing the "Commissioner of Patents, Washington, D. C."